United States Patent [19]

Albrecht

[11] 4,078,247
[45] Mar. 7, 1978

[54] INVERTER CIRCUIT CONTROL CIRCUIT FOR PRECLUDING SIMULTANEOUS CONDUCTION OF THYRISTORS

[75] Inventor: George Werner Albrecht, Flemington, N.J.

[73] Assignee: RCA Corporation, New York, N.Y.

[21] Appl. No.: 547,127

[22] Filed: Feb. 5, 1975

[51] Int. Cl.² .......................................... H02M 7/515
[52] U.S. Cl. ...................................... 363/96; 363/136
[58] Field of Search ................... 321/11, 12, 13, 18, 321/45 R, 45 C; 219/10.75, 10.77; 363/27, 28, 75, 76, 77, 95, 96, 98, 123, 135, 136

[56] References Cited

U.S. PATENT DOCUMENTS

| 3,120,634 | 2/1964 | Genuit | 321/45 R |
|---|---|---|---|
| 3,663,940 | 5/1972 | Schwarz | 363/28 |
| 3,781,503 | 12/1973 | Harnden, Jr. et al. | 219/10.77 |
| 3,852,656 | 12/1974 | Bourbeau | 321/11 |
| 3,852,657 | 12/1974 | Skogsholm et al. | 321/45 C |
| 3,859,583 | 1/1975 | Reed | 321/12 |
| 3,859,586 | 1/1975 | Wadlington | 321/18 |
| 3,919,620 | 11/1975 | McMurray et al. | 321/13 |
| 3,932,801 | 1/1976 | Peters, Jr. | 321/45 C |
| 3,935,528 | 1/1976 | Brenneisen et al. | 363/136 |
| 3,953,779 | 4/1976 | Schwarz | 363/28 |

FOREIGN PATENT DOCUMENTS

| 1,438,522 | 1/1969 | Germany | 363/136 |

*Primary Examiner*—Gerald Goldberg
*Attorney, Agent, or Firm*—H. Christoffersen; Allen LeRoy Limberg; John M. O'Meara

[57] ABSTRACT

A circuit suitable for use in an induction range. The circuit includes a resonant inverter having first and second gate controlled thyristor switches, the main conduction paths of which are serially connected between the power supply terminals. Trigger pulses for the switches are derived from the current supplied to the inverter load coil. The pulses are timed to prevent the first switch from being closed before the second switch has opened so that both switches can never be conductive at the same time. It also includes circuitry for stopping inverter operation in the event of an overcurrent condition and circuitry for adjusting the inverter output power.

25 Claims, 5 Drawing Figures

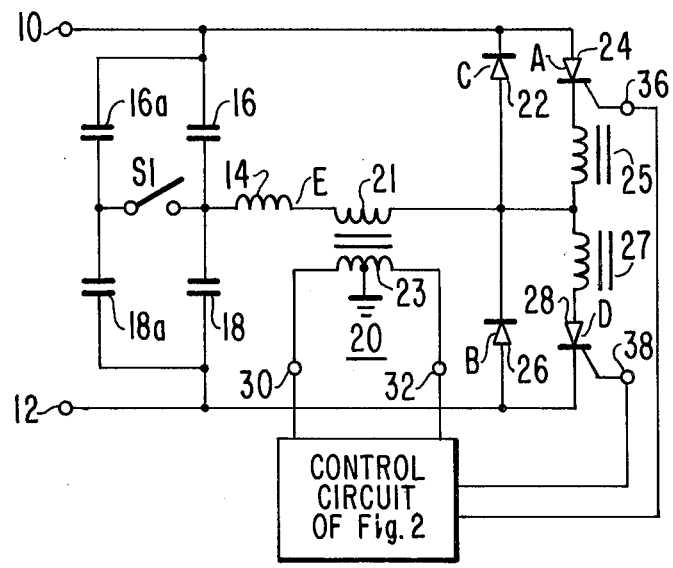
_Fig. 1._
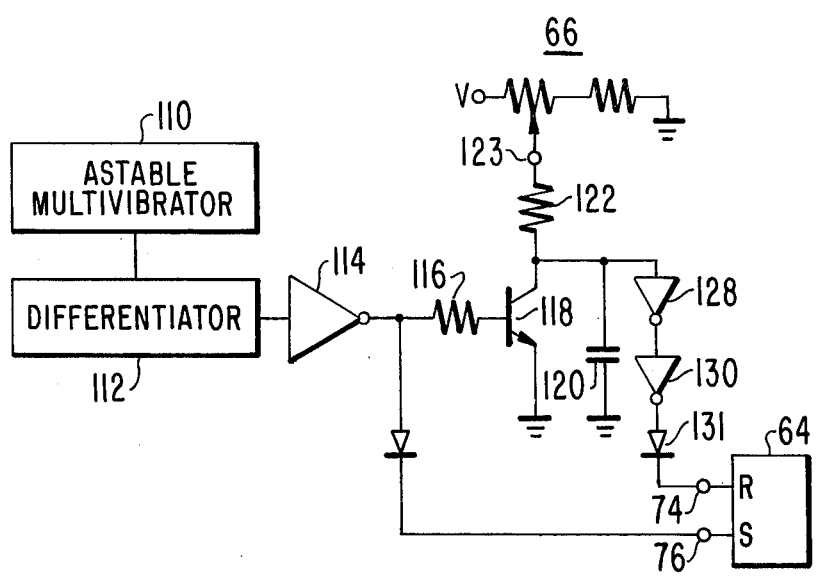
_Fig. 5._

INVERTER CIRCUIT CONTROL CIRCUIT FOR PRECLUDING SIMULTANEOUS CONDUCTION OF THYRISTORS

Induction heating has long been used in industrial applications. For example, induction heaters are used for the heat treating and melting of metals. While it was recognized that the industrial techniques could be extended to domestic applications such as induction ranges, prior to the past several years the complexity of the required equipment discouraged such use. Until the development of reliable solid state power conditioning devices, the heating process involved equipments such as motor-generator sets, magnetic multipliers or high power radio-frequency oscillators. These devices suffered from the handicaps of bulkiness, complexity and relative inefficiency.

Semiconductor devices are now available that have the necessary frequency response and power rating to make induction ranges for the home feasible. Inverters used in the ranges may now be built whose frequency of operation is in the ultrasonic region. This means that the power conditioning process will produce no objectionable sounds. Present devices permit operation at relatively high power levels. Thus, the amount of heat produced and the rate of heating of a cooking utensil is comparable to the values encountered in conventional gas and electric ranges.

Induction ranges have many advantages when compared with conventional ranges. Energy transfer between the range and the cooking utensil is by magnetic coupling rather than by the thermal process. In the former method, a high frequency signal produced by an inverter circuit induces a current in the metal utensil. The circulation of this induced current within the utensil produces the heat required for cooking. This form of coupling is a more efficient means of energy transfer between a utensil and the range than the thermal conduction processes of convection, conduction and radiation. With magnetic coupling, only the utensil is heated, unlike thermal coupling where much of the energy is lost to the surrounding atmosphere.

The elimination of the high temperature heating elements offers advantages besides more efficient energy transfer. Because of reduced radiation to the atmosphere, the ambient cooking area remains cooler. The induction range is safer than conventional ranges because the cooking surfaces remain cool, eliminating the danger of burns from coming into contact with a high temperature heating element. Besides the safety advantage, the cool cooking surface permits easy clean-up of foods spilled on it because the spilled food will not burn or scorch.

Induction ranges may be implemented in a configuration having a smooth, unbroken cooking surface with the heating coils located under this surface. The smooth surface has the advantages of being easy to clean and aesthetically pleasing. In addition, unused areas of the range surface provide additional work space for the cook.

Finally, because of the absence of thermal storage within the range heating element, the thermal response of an induction range is much faster than that of a conventional electric range, thereby reducing the risk of burning the food.

In the drawing:

FIG. 1 is a schematic drawing of a resonant inverter circuit;

FIG. 5 shows an element of the circuit of FIG. 2 in greater detail.

Figure 2:
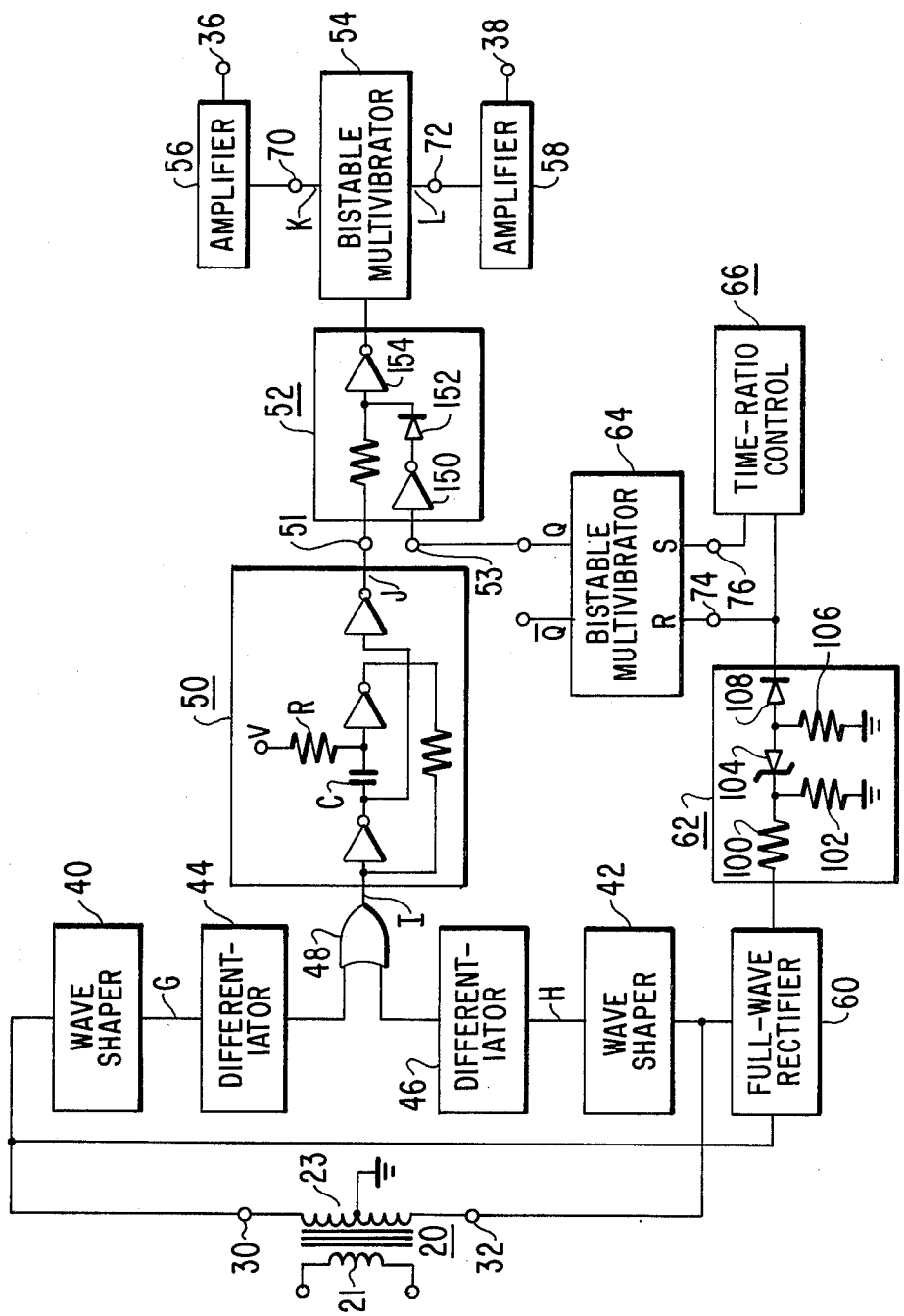
FIG. 2 is a block diagram of a control circuit for the circuit of FIG. 1.

In the half bridge resonant inverter circuit of FIG. 1, a source of operating potential (not shown) is connected between terminals 10 and 12. Two capacitors, 16 and 18, are connected in series between these terminals and load coil 14 is connected between the common connection of these capacitors and one end of the primary winding 21 of current transformer 20. Additional capacitors 16a and 18a may be coupled across capacitors 16 and 18, respectively, via switch S1. The cathode of diode 22 and the anode of gate-controlled thyristor switch 24 are connected to terminal 10 and the anode of diode 26 and the cathode of gate-controlled thyristor switch 28 are connected to terminal 12. Devices 24 and 28 are silicon-controlled rectifiers (SCR). The anode of device 22 and the cathode of device 26 are joined together and connected to the other end of the primary winding 21 of transformer 20. The cathode of SCR 24 and the anode of SCR 28 are also coupled through inductors 25 and 27, respectively, to winding 21. Terminals 30 and 32 of the secondary winding 23 of transformer 20 and gate electrodes 36 and 38 of SCR 24 and 28, respectively, are connected to the control circuit (shown in greater detail at FIG. 2).

In the operation of the circuit of FIG. 1, a dc or rectified ac voltage is applied across terminals 10 and 12. Assume that SCR 24 and SCR 28 are initially nonconducting. A control voltage applied to gate electrode 36 of SCR 24 causes this device to conduct current through its anode-cathode path. This current flows through load coil 14 in a first direction, charging capacitor 18. To use the inverter circuit shown in FIG. 1 as part of an induction range, coil 14 will generally be constructed as a planar helically-shaped element. Such a configuration permits efficient coupling of the coil's magnetic field to flat-bottomed cooking utensils. The cooking utensil is magnetically coupled to coil 14 and may be thought of as a single turn secondary winding of a transformer. The conduction of SCR 24 also causes the discharge of capacitor 16. Thus, the current through coil 14 is comprised of current from the operating potential and discharge current from capacitor 16.

As capacitor 18 becomes charged, the current through coil 14 decreases to zero. SCR 24 turns off at this time and capacitor 18 now begins to discharge through coil 14. The discharge current will be in the opposite direction from the charging current. Both SCR's are nonconducting at this time. The discharge current flows for a period of time through diode 22. After the desired period has elapsed, a trigger pulse is applied to the gate of SCR 28, rendering this device conductive, and causing the discharge current of capacitor 18 to be diverted from diode 22 to SCR 28. While SCR 28 conducts, capacitor 16 receives charge. As was the case for the conduction period of SCR 24, the coil current will be made up of the discharge current of a first capacitor, in this instance 18, and the charging current of a second capacitor. As capacitor 16 becomes charged, SCR 28 will turn off.

Capacitor 16 now begins to discharge through diode 26, causing the direction of current flow to once more reverse. At this time, its direction through the coil is the same as when capacitor 18 was being charged.

After a desired period of time has elapsed, a trigger pulse is supplied to the gate electrode of SCR 24 causing conduction of this device which in turn diverts the discharge current from diode 26 and causes the above-described cycle to repeat. Transformer 20 is a current transformer used to produce input signals for the control circuit to be described infra.

From the above description, it is seen that the direction of current through load coil 14 reverses periodically. This alternating load coil current induces in the cooking utensil the currents that heat the utensil. The frequency of the load coil current is determined primarily by the equivalent inductance of coil 14, which is a function, in part, of the magnetic properties of the cooking utensil used, and the values of capacitors 16 and 18. Switched capacitors 16a and 18a may be connected in parallel with capacitors 16 and 18, respectively, to vary the output power of the inverters for the purpose of temperature control. Techniques for temperature control will be discussed in greater detail below. The values of the above components are chosen to make the frequency of operation of the inverter greater than 18 KHz. This frequency is beyond the audible range for most people, thereby making the power conversion process noiseless.

Figure 3:
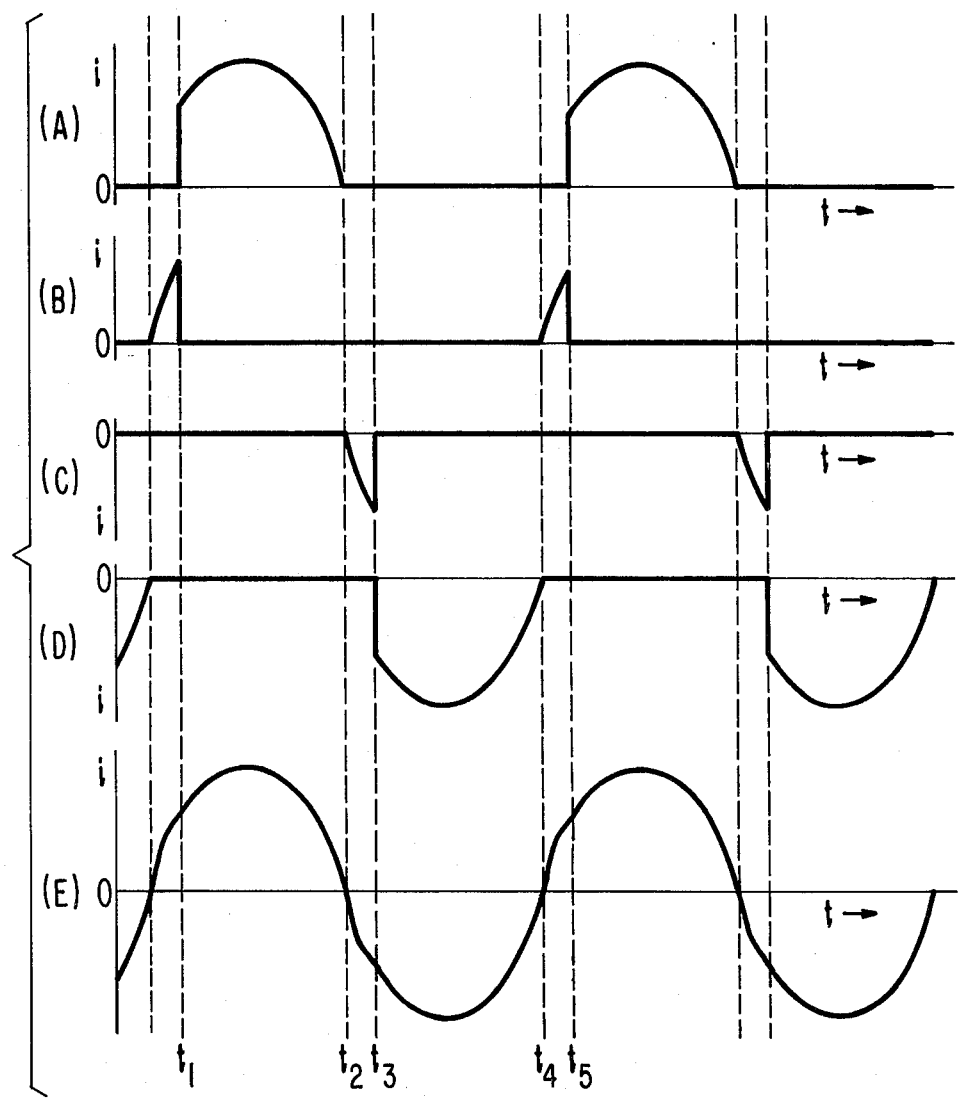
FIGS. 3 and 4 are drawings of waveforms present in the circuits of FIGS. 1 and 2, respectively.

Referring to FIG. 3, wave A represents the current flow through SCR 24. A trigger pulse is applied to the gate of this device at time $t_1$ causing conduction. At time $t_2$, SCR 24 stops conducting. During the interval $t_2$–$t_3$, the direction of current through the load coil reverses and this current, shown at C, flows through diode 22. At time $t_3$, a trigger pulse is applied to the gate of SCR 28, turning this device on, thereby causing the load current to flow through this device. This current is shown at D. At time $t_4$, SCR 28 stops conducting. The load current reverses and flows through diode 26 during the interval $t_4$–$t_5$, as shown at B. At time $t_5$, a trigger pulse applied to the gate of SCR 24 causes the above cycle to repeat. The waveform of the current through the load coil, shown at E, is nearly sinusoidal.

The function of diodes 22 and 26 is to permit the SCR connected in parallel with each diode to recover fully to its blocking state. The recovery time for the SCR is referred to in the literature as the turn-off time. Even though SCR 24 becomes nonconductive once the current flow through it had decreased to zero, if a forward bias is applied across the anode and cathode electrodes before the turn-off time has elapsed, the device once more becomes conductive, even in the absence of a gate trigger pulse. If SCR 28 were turned on before SCR 24 had recovered, two low impedance paths, i.e., the anode-cathode or main conduction path of each SCR, would be connected directly across the power supply, thereby causing excessive current flow through the SCR's and possibly damaging the power supply. Inductor 27 prevents excessive currents from existing within the inverter circuit when SCR 28 first turns on. At the instant of turn on, diode 22 may not have ceased conducting, resulting in the existance of a low impedance path, through diode 22 and SCR 28, across the power supply terminals. Inductor 27 prevents this undesired buildup of current by introducing a small time delay to the current increase in SCR 28, thereby permitting diode 22 to turn off before the SCR conducts full current. Inductor 25 functions in a similar manner to prevent SCR 24 and diode 26 from conducting simultaneously.

While diodes 22 and 26 are necessary to permit recovery of the SCR's, they should only conduct current for an interval that is slightly longer than the turn off time of each SCR. The reason that the conduction time of the diodes should be no greater than this interval relates to the output power that the inverter circuit will produce. Inverter circuits disclosed in the prior art using a single SCR and diode (see for example U.S. Pat. Nos. 3,781,503 and 3,786,219) require the diode to be conductive for each 180° of current flow. In such circuits, the peak current through the diode is substantially less than the peak current through the SCR. This, in turn, means that the output power of the range will be less than what would be produced if both currents were equal.

The diode current is less than the SCR current because of the energy supplied to the cooking utensil via load coil 14. Such a current reduction does not occur during the SCR conduction interval because energy is being provided by the power source during this interval. However, during the diode conduction interval, no energy is supplied by the source. Instead, the energy required for heating is derived from energy stored within the inverter, leading to a reduction of this stored energy and, in turn, the peak inverter current.

Similar results were observed in the circuit shown in FIG. 1 when gate triggers were supplied to the SCR's at a rate that caused each SCR and diode to conduct for one half cycle out of each two cycle interval. The output power produced by the circuit operated in this mode was found to be substantially less than that obtained when the diodes were allowed to conduct only long enough to permit recovery of the SCR's.

The inverter portion of the circuit of FIG. 1 therefore places two constraints upon its associated control circuit. First, the conduction time of diodes 22 and 26 should be minimized so that power may be supplied by the inverter circuit in a more efficient manner.

In addition, the conduction period of each diode, for example diode 22, must be long enough to ensure that, when the SCR not connected across the diode, in this example SCR 28, is triggered to a conducting state, the SCR connected across the particular diode, in this example SCR 24, has recovered to a forward blocking condition. If this second condition is not satisfied and SCR 28 becomes conductive before the turn off time of SCR 24 has elapsed, both SCR's will conduct. A very low impedance, namely the forward conduction impedances of two serially connected SCR's, is therefore placed across the source of operating potential. Such a condition causes high currents to be drawn from the source which may damage the source or the SCR's or may lead to potentially dangerous over-temperature conditions.

The control circuit of FIG. 1, shown in greater detail in FIG. 2, senses the load current through coil 14 by means of current transformer 20. Information obtained by this current sensing technique is used to derive control signals for each SCR that minimizes the conduction time of each diode but ensures that one SCR does not receive a trigger signal before the turn off time of the other SCR has elapsed.

In the circuit of FIG. 2, terminals 30 and 32 of transformer 20 connect to wave-shapers 40 and 42. The outputs of wave-shapers 40 and 42 are connected to differentiators 44 and 46, respectively. The differentiator output sgnals are applied via OR gate 48 to monostable multivibrator 50 whose output in turn is applied to terminal 51 of INHIBIT circuit 52. The output terminal of the inhibit circuit 52 is connected to bistable multivibrator (flip-flop) 54. This latter circuit has output terminals 70 and 72, the signal appearing at one terminal being the logical complement of the signal at the other terminal. Output terminal 70 connects to amplifier 56 which in turn connects to gate electrode 36 of SCR 24. Output terminal 72 connects to amplifier 58 which in turn connects to gate electrode 38 of SCR 28.

Transformer terminals 30 and 32 also connect to full-wave rectifier 60 which in turn connects to peak detector 62. The detector 62 output and a first output of the time-ratio control (TRC) circuit 66 connect to input terminals 74 and 76, respectively, of bistable multivibrator 64. A second TRC output terminal connects to terminal 74. The Q output of this multivibrator connects to input terminal 53 of INHIBIT circuit 52.

Figure 4:
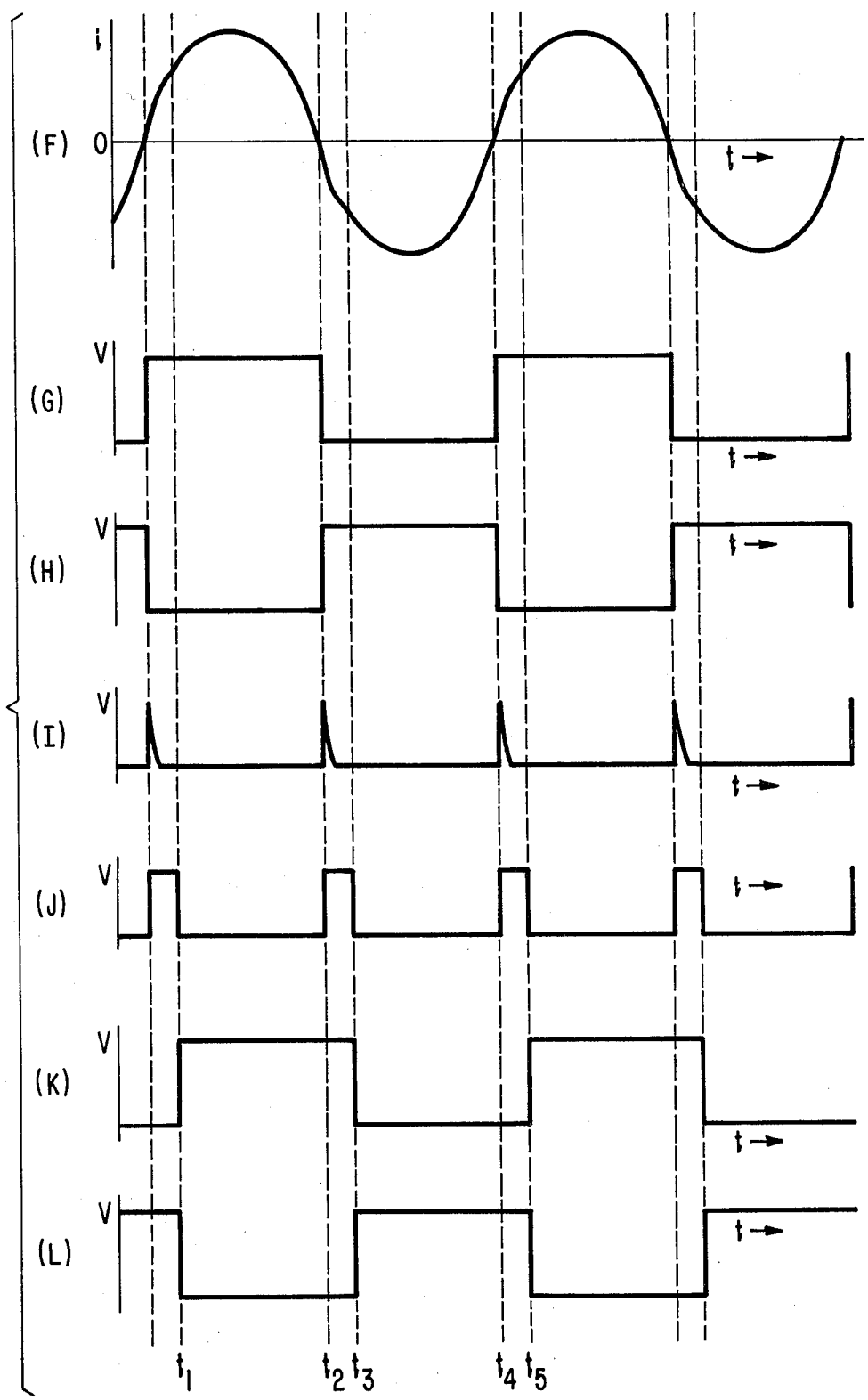

In the discussion which follows of the operation of the circuit of FIG. 2, both FIGS. 3 and 4 should be referred to. Wave F of the latter figure is the output current of the inverter circuit of FIG. 1 and is identical to wave E of FIG. 3. Times $t_1$ through $t_5$, shown in FIG. 4, correspond to like-numbered times shown in FIG. 3.

The current through load coil 14, shown at F of FIG. 4, is coupled by current transformer 20 to wave-shapers 40 and 42. The essentially sinusoidal output wave is converted to a square wave having the same frequency as the load current by each wave-shaper. The wave-shapers may be realized by Schmitt trigger circuits or high gain limiting amplifiers. The output signals of the wave-shapers are 180° out-of-phase with respect to each other because of the phase shift provided by the center-tapped secondary winding 23 of transformer 20, and are shown at G and H of FIG. 4. The output signals from shapers 40 and 42 are differentiated by differentiator circuits 44 and 46, respectively. The output of the differentiator circuits consists of positive pulses only. The negative pulses normally produced by the differentiation of a square wave are eliminated by diode clipping circuits within each differentiator. OR gate 48 passes the two differentiator outputs to the single trigger line for multivibrator 50. The pulses present at this line are shown at I of FIG. 4.

Pulses I trigger the monostable multivibrator 50. The latter produces the pulses shown at J of FIG. 4. The lagging edge of the pulses serves to trigger multivibrator 54 via circuit 52, as discussed below.

The INHIBIT circuit 52, when primed by an appropriate voltage level from bistable multivibrator 64, passes the monostable multivibrator 50 output signals to the bistable multivibrator 54. In the operation of the INHIBIT circuit 52, if a voltage level representing a logical zero, said level defined herein as a negative, low or zero voltage, is present at terminal 53, a voltage level representing a logical one, herein defined as a positive or high voltage, will appear at the output of inverter 150. This voltage causes diode 152 to become forward biased thereby applying the high voltage to the input terminal of inverter 154. The output of this inverter is a relatively low voltage and remains constant for as long as the low voltage is present at terminal 53 irrespective of the presence at terminal 51 of voltage pulses produced by multivibrator 50. Pulses produced by multivibrator 50 are thereby prevented from triggering flip-flop 54. Thus, a low voltage at terminal 53 provides the inhibit signal for circuit 52. When the voltage at terminal 53 is at a relatively high level, the output of inverter 150 is low and diode 152 is no longer forward biased. Thus, circuit 52 will no longer inhibit and the pulses present at 51 will be inverted by inverter 154 and applied to bistable multivibrator 54. This flip-flop is triggered by the trailing edge of the pulses produced by inverter 154.

The gate trigger signals for SCR's 24 and 28 are derived from the signals present at terminals 70 and 72 of multivibrator 54, shown at K and L of FIG. 4. As mentioned earlier, each signal is the logical complement of the other. Using conventional logic circuit terminology, one signal would represent the Q output of the flip-flop 54 while the other signal would represent the $\overline{Q}$ output. The flip-flop output signals are applied to amplifiers 56 and 58 where they are amplified and capacitively coupled to the SCR gates. Amplifiers 56 and 58 may not be necessary for proper operation of the circuit. This will depend upon the current producing capacity of multivibrator 54 and gate current requirements of the particular SCR's being used in the inverter circuit. If the amplifiers are not required, that is, if multivibrator 54 produces output signals at a sufficiently high level of power, the SCR gating signals may be obtained simply by capacitively coupling the gate electrodes to the multivibrator outputs.

The signals produced by multivibrators 54 are, in essence, the square waves produced by wave-shaping circuits 40 and 42 which have been delayed by a time T. This time delay, shown in FIG. 4 as interval $t_2-t_3$, is determined by the width of the output pulses from monostable multivibrator 50. Thus, the prior-mentioned control circuit constraints may be satisfied by the selection of the output pulse width of this multivibrator. Pulse width is a function of the product of the resistance of component R and the capacitance of component C of multivibrator 50 and may be changed by altering the value of R or C or both. The pulse width should equal, at a minimum, the turn off time of each SCR. In practice, the pulse width is made somewhat greater than this minimum value to allow for changes, with age or temperature, or other factors in the circuit parameters of multivibrator 50 or other of the circuits. While the turn off time of an SCR does not change with age, there is a wide variation in this parameter among devices of the same type. However, the pulse width should not be of such a long duration that diode 22 or 26 would be conductive for an excessive amount of time.

It is the complementary nature of the trigger signals produced by multivibrator 54 that ensures that one SCR will not receive a trigger pulse while the other SCR is also being triggered and it is the time delay T controlled by multivibrator 50 that ensures that a first SCR will not receive this trigger pulse before the other SCR has recovered to a blocking condition.

Full wave rectifier 60, peak detector 62 and multivibrator 64 comprise a circuit to prevent damage to the inverter components if the cooking utensil is removed while the inverter is activated. With no load coupled to load coil 14 (FIG. 1), capacitors 16 and 18 receive energy from the source faster than this energy can be dissipated within the inverter. This energy buildup causes excessive currents and voltages to exist within the inverter which may lead to component failure. To avoid this condition, the repetition rate of the SCR triggers may be reduced or the inverter may be stopped. If the former approach is used, the inverter circuit still consumes power while operating at a reduced frequency. Since power is being consumed at a time when no heating of a cooking utensil is occurring, the technique of reducing the trigger repetition rate has a detrimental effect on overall system efficiency.

In the circuit of the present invention, the increased flow that would accompany the pan removal is detected in the secondary circuit of transformer 20 by full wave rectifier 60 and peak detector 62. As the load current increases, so does the rectifier output voltage. This voltage is applied to detector 62. When the voltage exceeds a value corresponding to a safe operating level, a detector output signal is produced that triggers bistable multivibrator 64. The latter thereupon switches from a first to a second state. In this second state the enabling signal is removed from INHIBIT circuit 52, thereby preventing the application of trigger pulses to multivibrator 54.

Peak detector 62 includes serially connected resistors 100 and 102 connected between the input terminal and a reference potential (ground). The cathode electrode of Zener diode 104 is connected to the common connection of these resistors while its anode electrode is coupled to ground through resistor 106. Also connected to the anode of diode 104 is the anode electrode of diode 108. The cathode electrode of this latter device is the detector output terminal and is connected to the reset terminal 74 of set-reset (S-R) flip-flop 64.

In the operation of peak detector 62, the output voltage of full wave rectifier 60 increases until the voltage at the cathode terminal of Zener diode 104 is large enough to cause conduction of this device. When the Zener diode conducts, current flows through diode 108. This current serves as a reset signal for flip-flop 64, causing its Q output to drop to its low voltage state. As described earlier, such a voltage at terminal 53 of INHIBIT circuit 52 will cause inverter operation to cease.

Multivibrator 64 has relatively low frequency pulses periodically applied to its set input terminal that are produced by time-ratio control (TRC) circuit 66. If this flip-flop had been reset by peak detector 62, thereby inhibiting the inverter triggers, a pulse produced by TRC circuit 66 will set flip-flop 64 to its high state and remove the inhibiting voltage from INHIBIT circuit 52. The output of inverter 150 drops to a low state. This enables circuit 52. The voltage at terminal 51, which is low in the absence of a pulse from multivibrator 50 causes the output of inverter 154, which had been low in the presence of an inhibit signal, to increase to a high value. This change in dc level triggers flip-flop 54, producing a trigger pulse for one of the SCR's and normal circuit operation begins. If the over-current condition no longer exists, the circuit will continue to operate. If the overcurrent condition is still present, the inverter will once more be stopped after several cycles of operation.

For the above-described overload protection circuit, the connection shown in FIG. 2 between the TRC circuit 66 and reset terminal 74 of flip-flop 64 is unnecessary. This connection is used only when the TRC circuit is utilized in a second mode of operation which is independent of the protection mode. In this second mode, the TRC circuit may be used to vary the inverter output power. After the earlier mentioned periodic pulse produced by TRC circuit 66 sets flip-flop 64, a reset pulse, whose time relationship with respect to the set pulse may be varied, is produced by the TRC circuit. This reset pulse inhibits inverter operation by resetting flip-flop 64. The inverter remains disabled until the next set pulse is produced by circuit 66. By varying the reset interval of flip-flop 64 while applying set pulses to it at a uniform rate, the output power of the inverter may be varied. As the reset interval is made longer, the inverter output power decreases.

TRC circuit 66 is shown in greater detail in FIG. 5. The output of astable multivibrator 110 is differentiated and amplified by circuits 112 and 114, respectively. Elements 110, 112, and 114 comprise, in part, a set pulse generator. A first output of amplifier 114 is the earlier mentioned periodic pulse applied to terminal 76 of flip-flop 64. The output of amplifier 114 is also coupled to the base electrode of transistor 118 by resistor 116. The emitter electrode of this transistor is connected to ground potential. Capacitor 120 is connected between the collector electrode of transistor 118 and ground. Also connected to this collector electrode is resistor 122. This resistor is in turn connected to a source of variable voltage comprising a fixed voltage source (not shown) and a variable resistive voltage divider. This resistor may, in the alternative, be connected to a variable voltage source. The collector of transistor 118 is also connected to serially-connected inverters 128 and 130 which in turn connect to the reset input of flip-flop 64.

The power output of the inverter may be varied by setting flip-flop 64 to a state that inhibits inverter trigger pulses for a predetermined time out of each cycle of operation of the set pulse generator. The fraction of the set pulse period that the inverter is operating is herein defined as the system duty cycle. The inverter output power increases as the system duty cycle increases. It should be understood that the frequency of operation of the inverter is very high compared to the set pulse frequency. Thus, each period of inverter operation will typically encompass a large number of inverter oscillations.

In the operation of the TRC circuit, reference is made to FIG. 5. Assume that a set pulse has just been applied to the set terminal of flip-flop 64 enabling inverter operation. At the same instant, this pulse turns on transistor 118, thereby quickly discharging capacitor 120 to a value close to zero volts. The capacitor voltage appears as a low voltage at the output of inverter 130 which in turn tends to reverse bias diode 131. As a result, no signal is applied to reset terminal 74 of flip-flop 64.

Transistor 118 turns off quickly because of the short duration of the set pulse. At this time, capacitor 120 begins to charge through resistor 122 towards the voltage present at terminal 123. Resistor 122 has a very large value, typically several megohms, providing a relatively constant charging current to capacitor 120. The voltage across the capacitor, because of the nature of the charging current, rises at an essentially linear rate. When this voltage reaches the threshold voltage of inverter 128, this inverter output drops from a high to a low voltage which in turn causes a high voltage to appear at terminal 74, causing flip-flop 64 to change state. At this time the inverter trigger pulses become inhibited and inverter operation ceases.

The inverter remains inactive until the next set pulse. At this time, the above-described cycle repeats. The duty cycle may be varied in several ways. The charging rate of capacitor 120 may be varied either by changing the value of resistor 122 or by changing the voltage at terminal 123 by means of the variable voltage divider. Alternatively, the threshold of inverter 128 could be varied. In the present embodiment, duty cycle control is achieved by varying the voltage at terminal 123. Inverters 128 and 130 are realized using commercially available complementary symmetry metal-oxide semiconductor (COS/MOS) integrated circuit devices. Such inverters typically have turn on voltage thresholds on the order of 1.5 volts.

It should be noted that where TRC circuit 66 is to be used solely as a source of set pulses for the overload protection circuit, elements 116 through 131 of FIG. 5 may be eliminated. All elements shown in FIG. 5 are required only when the TRC circuit is to operate both in conjunction with the overload protection circuit and as a power output control circuit.

Referring to FIG. 1, temperature control may also be realized by switching capacitors into and out of the inverter circuit. For example, closing switch S1 places capacitors 16a and 18a across capacitors 16 and 18, respectively. This in turn increases the inverter capacitance. Increasing the network capacitance reduces the surge impedance of the inverter resonant circuit. This impedance is inversely proportional to the square root of the network capacitance. The decrease in network surge impedance permits a larger current to flow resulting in a higher output power. Conversely, the inverter power may be decreased by reducing the network capacitance. While only a single capacitor-switch combination is shown connected across each of the inverter capacitors 16 and 18 for purposes of illustration, it should be realized that the just-described concept may utilize virtually any number of capacitor-switch combinations.

In the present invention, temperature control is realized by using a combination of the above techniques. A plurality of switched capacitors is used to select a particular level of output power. The TRC circuit is then used to control the output power level within the selected range. A gross method of temperature control is realized with the switched capacitors. The TRC circuit then provides the necessary fine adjustment. It should be noted however that the output power of the inverter could be varied using either of the above-described techniques alone rather than a combination thereof.

What is claimed is:

1. In a circuit for supplying an alternating current to a load which includes two power supply terminals and first and second gate-controlled thyristor switches, each said switch having a gate electrode, a main conduction path and an associated turn-off time, the main conduction paths of said switches being connected in series between said terminals with each path having a commutating diode in inverse-parallel connection therewith, an improved control network for applying complementary signals to the gate electrodes of said switches to preclude their simultaneous conduction, said control network comprising:
    means in series with said load for sensing the current through said load;
    means responsive to said current sensing means for producing a trigger pulse at each zero crossing of said current;
    means responsive to each trigger pulse for producing a delay signal having a duration at least as great as the turn off time of said switches;
    first means responsive to the cessation of each alternate one of said delay signals for producing a first signal at the gate electrode of said first switch to render it conductive; and
    second means responsive to the cessation of each of the remaining alternate delay signals for producing a second signal at the gate electrode of said second switch to render it conductive.

2. The combination of claim 1 wherein said current sensing means comprises a transformer having a primary winding serially connected with said load, and a centertapped secondary winding having first and second output terminals, the center-tap of said secondary winding being connected to a reference potential with the signal appearing at said first output terminal being phase shifted by 180 electrical degrees relative to the signal appearing at said second output terminal.

3. The combination of claim 1 wherein said trigger pulse producing means comprises, in combination:
    means responsive to the current through said load for producing a first wave, said first wave having the same frequency as said current and varying in amplitude between two voltage levels;
    means responsive to the current through said load for producing a second wave whose instantaneous value is the complement of said first wave;
    a first differentiator circuit coupled to said first wave, said first differentiator producing a first voltage pulse for each transition of said wave voltage from its first to its second level;
    a second differentiator circuit coupled to said second wave, said second differentiator producing a second voltage pulse for each transition of said wave voltage from its first to its second level; and
    means responsive to said first and second voltage pulses for producing said trigger pulse.

4. The combination of claim 3 where said means for producing a first wave comprises a first high gain limiting amplifier, said amplifier being connected to the first output terminal of said transformer secondary winding.

5. The combination of claim 3 where said means for producing a second wave comprises a second high gain limiting amplifier, said amplifier being connected to the second output terminal of said transformer secondary winding.

6. The combination of claim 1 where said means for producing a pulse comprises a monostable multivibrator coupled to said means for producing a trigger pulse, said multivibrator output pulse width having a width at least as great as the turn off time of said switches.

7. The combination of claim 1 where said first means for producing a signal at the gate electrode of said first switch comprises in combination:
    a bistable multivibrator, said multivibrator having first and second output terminals, said first terminal signal being the logical complement of said second terminal signal; and
    first amplifier means coupled between said bistable multivibrator first terminal and said first switch gate electrode.

8. The combination of claim 7 where said second means for producing a signal at the gate electrode of said second switch comprises, in combination:
    second amplifier means coupled between said bistable multivibrator second output and said second switch gate electrode.

9. A resonant inverter circuit for converting a dc or rectified low frequency ac voltage to a relatively high frequency voltage comprising, in combination:
    first and second power supply terminals;
    first and second control voltage responsive switches, each switch having a control electrode and a main conduction path that passes current more readily in one direction than in the other and an associated turn off time, said switches having their main conduction paths serially connected between said first and second terminals;

first and second capacitors serially connected between said first and second terminals;

an induction coil connected between the common connection of said first and second switches and the common connection of said first and second capacitors forming a resonant circuit thereby;

first and second nonlinear devices, said devices passing current more readily in one direction than in the other, said first and second devices being connected in inverse-parallel with the main conductive paths of said first and second switches, respectively;

means for continuously sensing the flow of current through said coil to produce a trigger pulse each time said current reduces to zero;

means responsive to each trigger pulse for producing a delay signal having a duration at least as great as the turn-off time of said switches; and means responsive to the cessation of each said delay signal for producing alternate signals at the gate electrodes of said first and second switches, respectively, to render each said switch separately conductive after an interval equal to the duration of said delay signal from the time current through said coil reduces to zero.

10. The combination recited in claim 9 where said first and second control voltage responsive switches comprise silicon controlled rectifiers.

11. The combination recited in claim 9 where said first and second nonlinear devices comprise diodes.

12. The combination of claim 9 wherein said current sensing means comprises, in combination:

a transformer having a primary winding and a secondary winding, said primary winding being connected in series with said induction coil so said coil current flows through said primary winding, said secondary winding having first and second terminals at respective ends thereof and having a third terminal at a center-tap thereof, said third terminal being connected to a reference potential;

first threshold means connected to said secondary winding first terminal for producing a voltage at a first level whenever current through said first terminal is greater than a reference level and at a second level whenever current through said first terminal is less than said reference level;

second threshold means connected to said secondary winding second terminal for producing a voltage at said first level whenever current through said second terminal is greater than said reference level and at said second level whenever current through said second terminal is less than said reference level; and means responsive to the transition of voltage produced by said first and second threshold means from said first level to said second level for producing said trigger pulse.

13. The combination of claim 12 where said first and second threshold means each comprises a high gain limiting amplifier.

14. The combination of claim 12 where said trigger pulse producing means comprises in combination:

a first differentiator circuit having an input coupled to said first threshold means and having an output;

a second differentiator circuit having an input coupled to said second threshold means and having an output;

a logic OR gate having first and second input terminals connected to the outputs of said first differentiator and said second differentiator respectively, said logic gate having an output terminal at which an output signal is supplied whenever a signal of sufficient amplitude is present at said first or second terminal.

15. The combination of claim 14 where said delay signal producing means comprises in combination:

a monostable multivibrator to which the output terminal of said OR gate is coupled, for producing a pulse in response to said OR gate output signal, said pulse having a width at least as great as the turn off time of said first and second switches.

16. The combination of claim 15 where said alternating signals producing means comprises in combination:

a first bistable multivibrator having first and second output terminals, the signal at said first terminal being the logical complement of the signal at said second terminal;

first amplifier means with an input to which the first output terminal of said first bistable multivibrator is coupled and with an output coupled to the control electrode of said first control voltage responsive switch; and second amplifier means to which the second output terminal of said bistable multivibrator is coupled and with an output coupled to the control electrode of said second control voltage responsive switch.

17. The combination of claim 16 further including means for interrupting operation of the inverter if said load current exceeds a predetermined level comprising, in combination:

a rectifier circuit, said rectifier coupled to the secondary winding of said transformer, and producing an output voltge proportional to the amplitude of said load current;

a threshold detector circuit, said detector coupled to said rectifier and producing an output voltage whenever said rectifier output exceeds a predetermined level;

a second bistable multivibrator having first and second input terminals and a single output terminal, said multivibrator first input terminal coupled to said detector and producing an output voltage corresponding to a first logic level whenever said detector output voltage is present and a voltage corresponding to a second logic level otherwise;

an INHIBIT logic circuit, said circuit having a first and second intput terminals, said INHIBIT first input terminal connected to the output of said monostable multivibrator, said INHIBIT second input terminal connected to said second bistable multivibrator output and said INHIBIT circuit output connected to the input of said first bistable multivibrator, said INHIBIT circuit preventing said monostable multivibrator pulses from triggering said first bistable multivibrator when said second bistable output voltage corresponds to a first logic level and allows said pulses to trigger said first bistable multivibrator otherwise.

18. The combination of claim 17 further including a circuit for varying the output power of said inverter comprising, in combination:

an oscillator having output pulses whose voltage varies between a first and a second voltage level;

a differentiator circuit coupled to said oscillator for producing a voltage that represents the time derivative of said oscillator voltage;

amplifier means coupled to said differentiator circuit, said amplifier output coupled to the second input terminal of said second bistable multivibrator thereby setting said multivibrator to a voltage corresponding to a second logic level;

a voltage ramp generator coupled to said amplifier output, said voltage ramp initiated by said amplifier output, where the slope of said ramp is variable; and threshold means responsive to said ramp generator for producing an output voltage whenever said ramp voltage exceeds a predetermined level, said voltage coupled to the first input of said second bistable multivibrator thereby setting said multivibrator to a voltage corresponding to a first logic level whenever said threshold means output voltage is present.

19. The power circuit of claim 18 further including one or more capacitors coupled across each of said first and second capacitors by switching means whereby said power is increased when said switching means are closed and decreased when said switching means are open.

20. In a circuit of the type wherein AC voltage is impressed across a load from a DC source through a switching network which includes series-connected thyristors, each having a commutating diode in inverse-parallel conduction with its principal conduction path, and a resonant circuit having capacitance and inductance disposed therein, an improved control network for applying complementary signals to the gates of the thyristors to preclude their simultaneous conduction, said control network including:

means for generating a square wave upon the occurance of each zero current crossing through the load, the duration of said square wave being at least equal to the maximum turn off time of the thyristors; and means for alternating complementary output signals in response to the trailing edge of sequential signals from said square wave generating means, said complementary output signals being separately applied to the thyristor gates.

21. The circuit of claim 20 wherein inductance for the resonant circuit includes a primary winding on a transformer serially connected to the load and wherein a secondary winding on said transformer is center-tapped to a reference potential in said square wave generating means with signals of complementary phase separately appearing from the end terminals thereof.

22. The circuit of claim 21 wherein the square wave generating means further includes a monostable multivibrator having the output therefrom connected to the input of said means for alternating complementary output signals and having the input thereto connected to output from an OR gate, said end terminals on said secondary winding each being connected separately to the inputs of said OR gate through respective zero crossing detection means.

23. The circuit of claim 22 wherein said monostable multivibrator includes means for varying the duration of output pulses therefrom to thereby determine the periods of conduction through both the commutating diodes and the thyristors.

24. The circuit of claim 23 wherein means for periodically inhibiting transfer of signals from said square wave generating means to said complementary output signals means establishes a power regulating duty cycle.

25. The circuit of claim 20 wherein means for periodically inhibiting transfer of signals from said square wave generating means to said complementary output signals means establishes a power regulating duty cycle.

* * * * *

UNITED STATES PATENT OFFICE
CERTIFICATE OF CORRECTION

PATENT NO. : 4,078,247
DATED : March 7, 1978
INVENTOR(S) : George Werner Albrecht It is certified that error appears in the above-identified patent and that said Letters Patent are hereby corrected as shown below:

Column 4, line 68, "sgnals" should be --signals--.

Column 6, line 26, "multivibrators" should be --multivibrator--.

Column 7, line 5, --current-- should be inserted before "flow".

Claim 19, line 1, --varying-- should be inserted after "power".

Signed and Sealed this

Twenty-eighth Day of November 1978

[SEAL]

Attest:

RUTH C. MASON
*Attesting Officer*

DONALD W. BANNER
*Commissioner of Patents and Trademarks*